United States Patent
Zhou et al.

(10) Patent No.: US 10,785,366 B2
(45) Date of Patent: Sep. 22, 2020

(54) METHOD, APPARATUS, AND ELECTRONIC DEVICE FOR CONTROLLING DISPLAY SCREEN BACKLIGHT, AND STORAGE MEDIUM

(71) Applicant: HUAWEI TECHNOLOGIES CO., LTD., Shenzhen, Guangdong (CN)

(72) Inventors: Dongdong Zhou, Shanghai (CN); Xiyu Zhou, Shanghai (CN); Guanglin Wang, Shanghai (CN); Liang Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/091,496

(22) PCT Filed: Apr. 5, 2016

(86) PCT No.: PCT/CN2016/078446
§ 371 (c)(1),
(2) Date: Oct. 4, 2018

(87) PCT Pub. No.: WO2017/173568
PCT Pub. Date: Oct. 12, 2017

(65) Prior Publication Data
US 2019/0124197 A1 Apr. 25, 2019

(51) Int. Cl.
*H04M 1/725* (2006.01)
*H04M 1/22* (2006.01)
(Continued)

(52) U.S. Cl.
CPC ........ *H04M 1/72569* (2013.01); *G01S 17/04* (2020.01); *G01S 17/08* (2013.01);
(Continued)

(58) Field of Classification Search
CPC .... H04M 1/22; H04M 1/72569; H04M 1/725; H04M 1/0202; H04M 1/0266;
(Continued)

(56) References Cited

U.S. PATENT DOCUMENTS

2011/0076003 A1* 3/2011 Cho ................ G03B 17/20
396/297
2015/0123922 A1 5/2015 Cao et al.
(Continued)

FOREIGN PATENT DOCUMENTS

CN 101741983 A 6/2010
CN 102665008 A 9/2012
(Continued)

OTHER PUBLICATIONS

Extended European Search Report issued in European Application No. 16897503.5 dated Dec. 13, 2018, 7 pages.
(Continued)

*Primary Examiner* — Christopher E Leiby
(74) *Attorney, Agent, or Firm* — Fish & Richardson P.C.

(57) ABSTRACT

Embodiments of the present disclosure provide a method, an apparatus, and an electronic device for controlling a display screen backlight, and a storage medium. It is determined, with reference to an included angle between the electronic device and a preset direction and whether there is an object shielding an aperture in a call state, that the display screen backlight is adjusted to be on or off.

17 Claims, 4 Drawing Sheets

(51) Int. Cl.
*G01S 17/04* (2020.01)
*G01S 17/08* (2006.01)

(52) U.S. Cl.
CPC ............. *H04M 1/22* (2013.01); *H04M 1/725* (2013.01); *H04M 2250/12* (2013.01)

(58) Field of Classification Search
CPC .. H04M 2250/12; G01S 17/08; G01S 17/026; H04W 52/0254; H04W 52/027; H04W 8/22; Y02D 70/144; Y02D 70/142
See application file for complete search history.

(56) References Cited

U.S. PATENT DOCUMENTS

| | | | | |
|---|---|---|---|---|
| 2015/0264170 | A1* | 9/2015 | Lockwood | H04W 52/0254 455/418 |
| 2016/0150399 | A1* | 5/2016 | Zhang | H04W 8/22 455/418 |
| 2016/0179265 | A1* | 6/2016 | Zeng | G06F 3/0416 345/173 |

FOREIGN PATENT DOCUMENTS

| | | |
|---|---|---|
| CN | 102883061 A | 1/2013 |
| CN | 103024197 A | 4/2013 |
| CN | 104243646 A | 12/2014 |
| CN | 104618565 A | 5/2015 |
| CN | 104811547 A | 7/2015 |
| JP | 5069205 B2 | 11/2012 |

OTHER PUBLICATIONS

International Search Report and Written Opinion issued in International Application No. PCT/CN2016/078446 dated Dec. 29, 2016, 23 pages.

* cited by examiner

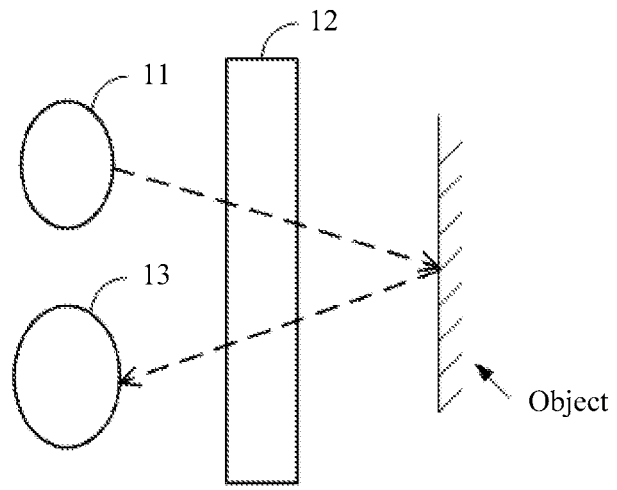

FIG. 1

| When an electronic device is in a call state, determine an included angle between the electronic device and a preset direction, and determine whether there is an object shielding an aperture | S101 |

| Turn off a display screen backlight when the included angle between the electronic device and the preset direction is greater than or equal to a preset angle and there is an object shielding the aperture | S102 |

FIG. 2

METHOD, APPARATUS, AND ELECTRONIC DEVICE FOR CONTROLLING DISPLAY SCREEN BACKLIGHT, AND STORAGE MEDIUM

CROSS-REFERENCE TO RELATED APPLICATIONS

This application is a National Stage of International Application No. PCT/CN2016/078446, filed on Apr. 5, 2016, which is hereby incorporated by reference in its entirety.

TECHNICAL FIELD

Embodiments of the present disclosure relate to communications technologies, and in particular, to a method, an apparatus, and an electronic device for controlling a display screen backlight, and a storage medium.

BACKGROUND

In a terminal, an optical proximity sensor includes an infrared emitting diode (Infrared Emitting Diode, IR LED for short) and an infrared receiver. In addition, on a display screen of the terminal, an aperture is disposed near an earpiece. As shown in FIG. 1, an IR LED 11 emits infrared light through an aperture 12. An infrared receiver 13 receives infrared light that is outside the aperture 12 and that is reflected by an object located in a direction in which the IR LED emits the infrared light, and transmits an intensity value of the received infrared light to a processor (not shown in the figure). The processor determines, according to the intensity value of the infrared light, whether there is an object near the aperture. When it is determined that there is no object near the aperture, a display screen backlight is turned on; or when it is determined that there is an object near the aperture, the display screen backlight is turned off, so as to automatically adjust the display screen backlight to be on or off and to reduce power consumption. A shorter distance between the object and the aperture indicates a larger intensity value of the infrared light that is reflected by the object and that is received by the infrared receiver.

That the processor determines, according to the intensity value of the infrared light, whether there is an object near the aperture is specifically: When the intensity value of the infrared light is greater than or equal to an upper limit, the processor determines that there is an object near the aperture, where the upper limit is a preset threshold for turning off the display screen backlight; or when the intensity value of the infrared light is less than or equal to a lower limit, the processor determines that there is no object near the aperture, where the lower limit is a preset threshold for turning on the display screen backlight.

However, in a scenario that the aperture is covered by a dark object (such as hair), or the like, when the aperture is covered by the dark object, the light emitted by the IR LED is absorbed by the dark object because the dark object has a strong capability of absorbing the light. Therefore, the intensity of the infrared light reflected to the infrared receiver is relatively weak. For example, during a call process, a user puts the terminal close to an ear, and in a normal situation, the infrared light emitted by the IR LED passes through the aperture and then is reflected to the infrared receiver by the ear. The intensity value of the infrared light transmitted to the processor by the infrared receiver is greater than the upper limit. The processor accordingly determines that there is an object shielding the aperture, and the display screen backlight is turned off. However, if hair accidentally shields the aperture when a user in a call holds the terminal next to an ear, the light emitted by the IR LED is absorbed by the hair, and the intensity value of the infrared light reflected to the infrared receiver is less than the lower limit. The processor accordingly determines that no object shields the aperture currently, and controls the display screen to be in a turned-on state, causing inaccurate adjustment of the display screen backlight.

SUMMARY

Embodiments of the present disclosure provide a method, an apparatus, and an electronic device for controlling a display screen backlight, and a storage medium, so as to improve accuracy of adjusting the display screen backlight to be on or off when an aperture is covered by a dark object.

According to a first aspect, an embodiment of the present disclosure provides a method for controlling the display screen backlight, applied to an electronic device with an optical proximity sensor, where an aperture is disposed on the electronic device, the optical proximity sensor detects intensity of infrared light by using the aperture, and the method includes: when it is detected that the electronic device is in a call state, determining an included angle between the electronic device and a preset direction, and determining whether there is an object shielding the aperture; and when the included angle between the electronic device and the preset direction is greater than or equal to a preset angle and there is an object shielding the aperture, turning off the display screen backlight.

In this embodiment of the present disclosure, when it is detected that the electronic device is in a call state, the included angle between the electronic device and the preset direction is determined and whether there is an object shielding the aperture is determined. When the included angle between the electronic device and the preset direction is greater than or equal to the preset angle and there is an object shielding the aperture, the display screen backlight is turned off. In this way, it is determined, with reference to the included angle between the electronic device and the preset direction and whether there is an object shielding the aperture in a call state, that the display screen backlight is to be turned off or turned on. Compared with the prior-art solution that the display screen backlight is turned off or turned on merely according to whether there is an object shielding the aperture, this embodiment of the present disclosure may improve accuracy of adjusting the display screen backlight to be on or off, improving user experience.

In a first possible implementation of the first aspect, the preset direction is a vertical direction, and the determining an included angle between the electronic device and a preset direction may include: determining an included angle between the vertical direction and an axis perpendicular to a plane where a display screen of the electronic device is located; or determining an included angle between the vertical direction and a plane where a display screen of the electronic device is located.

In a second possible implementation of the first aspect, the determining whether there is an object shielding the aperture includes: determining a current intensity value of the infrared light; and if the current intensity value of the infrared light is greater than or equal to a preset threshold, determining that there is an object shielding the aperture; or if the current intensity value of the infrared light is less than a preset threshold, determining that no object shields the aperture.

In a third possible implementation of the first aspect, the preset threshold is an intensity value of infrared light received by the optical proximity sensor when a dark object shields the aperture.

In this embodiment of the present disclosure, the preset threshold is an intensity value of infrared light received by an infrared receiver when the dark object shields the aperture. When the dark object shields the aperture, the intensity of the infrared light received by the infrared receiver was relatively weak because the dark object has a relatively strong capability of absorbing the infrared light. Therefore, the preset threshold is less than a lower limit. When a user holds the electronic device in a call state and black hair shields the aperture, the intensity value of the infrared light reflected to the infrared receiver may be less than the lower limit and greater than or equal to the preset threshold because most of the infrared light emitted by an infrared emitter is absorbed by the black hair. It is determined, according to the intensity of the infrared light, that there is an object shielding the aperture, and further the display screen backlight is turned off. Compared with the prior art, this embodiment of the present disclosure can improve user experience, reduce a loss, and prolong a battery service life.

In a fourth possible implementation of the first aspect, the method further includes: turning on the display screen backlight when the included angle between the electronic device and the preset direction is greater than or equal to the preset angle and no object shields the aperture. A difference between the specific implementation and the foregoing embodiment lies in only that whether there is an object shielding the aperture. This can avoid turning off the display screen backlight in a scenario of performing a call far from an ear, improving user experience.

In a possible design, to prevent misoperations, when a period for which the included angle between the electronic device and the preset direction keeps greater than or equal to the preset angle is longer than a first preset period, and/or a period for which an object shields the aperture is longer than a second preset period, the display screen backlight is turned off. The first preset period and the second preset period may be equal or may not be equal. No limitation is set in this embodiment of the present disclosure. The implementation can prevent ping-pong adjustment for turning on or turning off the display screen backlight.

According to a second aspect, an embodiment of the present disclosure provides an apparatus for controlling a display screen backlight, applied to an electronic device with an optical proximity sensor, where an aperture is disposed on the electronic device, the optical proximity sensor detects intensity of infrared light by using the aperture, and the apparatus includes: a determining module, configured to: when it is detected that the electronic device is in a call state, determine an included angle between the electronic device and a preset direction, and determine whether there is an object shielding the aperture; and a processing module, configured to turn off the display screen backlight when the included angle between the electronic device and the preset direction is greater than or equal to a preset angle and there is an object shielding the aperture.

A same inventive concept is used. A principle used by the apparatus to resolve the problem is corresponding to the solution in the method design of the first aspect. Therefore, for the implementation of the apparatus, reference may be made to the implementation of the method, and details are repeated herein.

According to a third aspect, an embodiment of the present disclosure provides an electronic device for controlling a display screen backlight. The electronic device has an optical proximity sensor. The optical proximity sensor includes an infrared emitting diode and an infrared receiver. An aperture is disposed on the electronic device. The infrared emitting diode emits infrared light. The infrared receiver detects intensity of the infrared light by using the aperture. The electronic device further includes a processor and a memory. The memory is configured to store an executable instruction, and the processor calls the executable instruction stored in the memory, to implement the solution in the method design of the first aspect, and details are not repeated herein.

According to a fourth aspect, an embodiment of the present disclosure provides a non-transitory computer readable storage medium storing one or more programs. The one or more programs include an instruction, and when being executed by an electronic device with an optical proximity sensor, the instruction enables the electronic device to execute the solutions in the method designs of the first aspect, and details are not repeated herein.

These and other aspects of the present disclosure are more clear and easy to understand in descriptions of the following (multiple) embodiments.

BRIEF DESCRIPTION OF DRAWINGS

To describe the technical solutions in some embodiments of the present disclosure or in the prior art more clearly, the following briefly describes the accompanying drawings for describing the embodiments or the prior art. Apparently, the accompanying drawings in the following description show merely some embodiments of the present disclosure, and persons of ordinary skill in the art may still derive other drawings from these accompanying drawings without creative efforts.

FIG. 1 is a schematic diagram of relative positions among an aperture, an IR LED, and an infrared receiver;

FIG. 2 is a schematic flowchart of Embodiment 1 of a method for controlling a display screen backlight according to the present disclosure;

DESCRIPTION OF EMBODIMENTS

Figure 3:
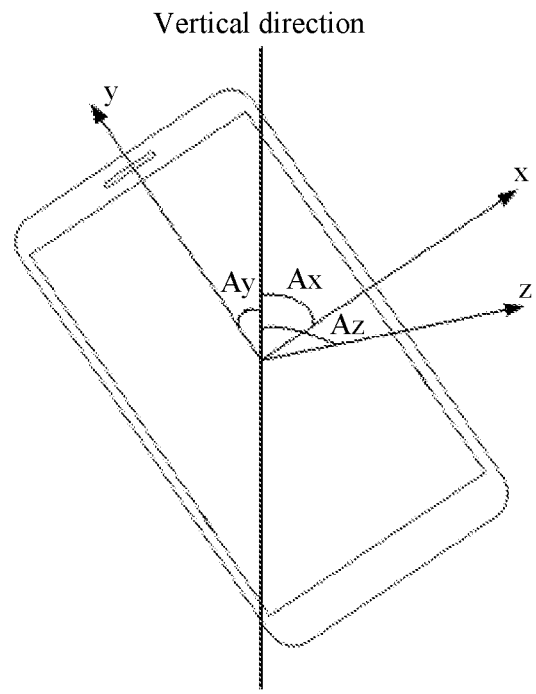
FIG. 3 is a schematic diagram of included angles between a terminal and x, y, and z coordinate axes.

The following clearly describes the technical solutions in some embodiments of the present disclosure with reference to the accompanying drawings in some embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

The terms "include", "contain" and any other variants in the specification, claims, and the accompanying drawings of the present disclosure mean to cover the non-exclusive inclusion, for example, a process, method, system, product, or device that includes a list of steps or units is not necessarily limited to those steps or units, but may include other steps or units not expressly listed or inherent to such a process, method, product, or device.

FIG. 2 is a schematic flowchart of Embodiment 1 of a method for controlling a display screen backlight according to the present disclosure. An embodiment of the present disclosure provides a method for controlling a display screen backlight. The method may be executed by an apparatus for controlling the display screen backlight. The apparatus may be implemented by means of software and/or hardware, and the apparatus may be integrated into a mobile phone and another electronic device supporting a call function. It should be clarified that the electronic device has a display screen and an optical proximity sensor, and an aperture is disposed on the display screen. As shown in FIG. 2, the method includes the following steps.

S101. When the electronic device is in a call state, determine an included angle between the electronic device and a preset direction, and determine whether there is an object shielding the aperture.

S102. Turn off the display screen backlight when the included angle between the electronic device and the preset direction is greater than or equal to a preset angle and there is an object shielding the aperture.

If it is detected that the electronic device is in a call state, the included angle between the electronic device and the preset direction is determined, so as to determine a posture of holding the electronic device by a user according to the included angle between the electronic device and the preset direction and with reference to a call state, for example, whether the user holds the electronic device next to an ear to answer a call.

For the included angle between the electronic device and the preset direction, persons skilled in the art may understand that a preset direction is first set, and then when the user holds the electronic device next to an ear, an angle is formed between the electronic device and the preset direction. Therefore, in a specific implementation, magnitude of an included angle between the electronic device and the preset direction when a user holds the electronic device next to the ear may be calculated according to a user's habit of using the electronic device.

As shown in FIG. 3, the included angle between the electronic device and the preset direction may be an included angle between a vertical direction and an axis perpendicular to a plane where a display screen of the electronic device is located, namely Az, where a z-axis indicates an axis perpendicular to the plane where the display screen is located; or, may be an included angle between a vertical direction and a plane where a display screen of the electronic device is located, such as an Ax or Ay, where an x-axis is parallel to an upper/lower edge of the electronic device, and a y-axis is parallel to a left/right edge of the electronic device.

In the foregoing embodiment, the preset direction may be the vertical direction. In this scenario, the determining an included angle between the electronic device and the preset direction may include: determining the included angle between the electronic device and the vertical direction by using a gravity sensor. For example, for the included angle shown in FIG. 3, acceleration Gx, Gy, and Gz that are in a direction of the x-axis, the y-axis, and the z-axis respectively may be read out by using the gravity sensor, and Ax, Ay, and Az may be obtained by using the following equations:

$$Gx = g \times \cos Ax,$$

$$Gy = g \times \cos Ay Gy = g \times \cos Ay, \text{ and}$$

$$Gz = g \times \cos Az Gz = g \times \cos Az,$$

where g is gravitational acceleration.

In the foregoing manner, the included angle between the vertical direction and the axis perpendicular to the plane where the display screen of the electronic device is located (namely Az), or the included angle between the vertical direction and the plane where the display screen of the electronic device is located (namely Ax or Ay) is determined.

In addition, for determining whether there is an object shielding the aperture, reference is also made to FIG. 1. An intensity value of infrared light reflected to an infrared receiver 13 by an object is greater when the object is closer to an aperture 12, and therefore, it may be determined, according to the intensity value of the infrared light received by the infrared receiver 13, whether there is an object shielding the aperture. When the intensity value of the infrared light received by the infrared receiver 13 is greater than an upper limit, it may be determined that there is an object shielding the aperture.

When the included angle between the electronic device and the preset direction is greater than or equal to the preset angle and there is an object shielding the aperture, the display screen backlight is turned off (step S102).

Specifically, determining a magnitude relationship between the preset angle and the included angle between the electronic device and the preset direction includes: determining that the included angle between the electronic device and the preset direction is greater than or equal to the preset angle, or the included angle between the electronic device and the preset direction is less than the preset angle.

When the included angle between the electronic device and the preset direction is greater than or equal to the preset angle, it may be preliminarily determined that the electronic device is in a state of being handheld by a user, and with reference to a call state, it is determined that the user holds the electronic device next to an ear, which is defined as an answering posture herein. When the included angle between the electronic device and the preset direction is less than the preset angle or the electronic device is not in a call state, it is determined that the user does not hold the electronic device next to an ear, which is defined as a non-answering posture.

Persons skilled in the art may understand that the magnitude relationship between the preset angle and the included angle between the electronic device and the preset direction provided in this embodiment of the present disclosure is merely a specific implementation of this embodiment of the present disclosure and may be properly adjusted according to a design requirement.

It should also be noted that the answering posture and the non-answering posture are merely used to distinguish whether a user holds the electronic device next to an ear, and other terms may be used to define whether a user holds the electronic device next to an ear. No limitation is set thereto in this embodiment of the present disclosure.

Figure 4:
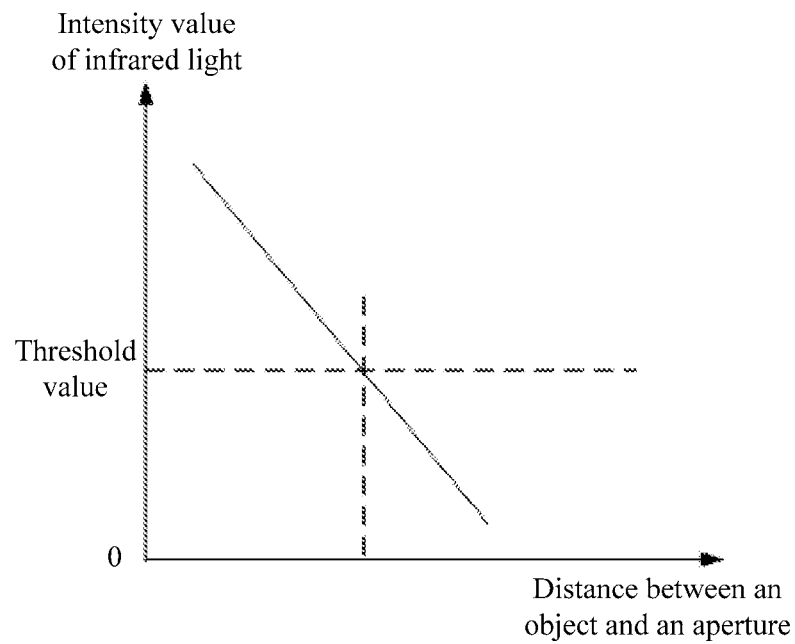
FIG. 4 shows a correspondence between an intensity value of infrared light received by an infrared receiver and a distance between an object and an aperture.

FIG. 4 shows a correspondence between an intensity value of infrared light received by an infrared receiver and a distance between an object and an aperture. As shown in FIG. 4, a lateral axis indicates the distance between the object and the aperture, a longitudinal axis indicates the intensity value of infrared light received by the infrared receiver, and the distance between the object and the aperture is inversely proportional to the intensity value of the infrared light received by the infrared receiver: A greater distance between the object and the aperture indicates a smaller intensity value of the infrared light received by the infrared receiver. It should be understood in this field that when the intensity value of the infrared light is greater than or equal to a threshold (such as a preset threshold mentioned below), the distance between the object and the aperture is less than a fixed value, that is, there is an object shielding or near the aperture.

In some implementations, to prevent misoperations, when a period for which an included angle between the electronic device and a preset direction keeps greater than or equal to the preset angle is longer than a first preset period, and/or a period for which an object shields the aperture is longer than a second preset period, the display screen backlight is turned off. The first preset period and the second preset period may be equal or may not be equal. No limitation is set in the present disclosure.

In this embodiment, when it is detected that the electronic device is in a call state, the included angle between the electronic device and the preset direction is determined and whether there is an object shielding the aperture is determined. When the included angle between the electronic device and the preset direction is greater than or equal to the preset angle and there is an object shielding the aperture, the display screen backlight is turned off. In this way, it is determined, with reference to the included angle between the electronic device and the preset direction and whether there is an object shielding the aperture in a call state, that the display screen backlight is to be turned off or turned on. Compared with the prior-art solution that the display screen backlight is turned off or turned on merely according to whether there is an object shielding the aperture, this embodiment of the present disclosure may improve accuracy of adjusting the display screen backlight to be on or off, improving user experience.

Optionally, the determining whether there is an object shielding the aperture may specifically be: determining a current intensity value of the infrared light; and if the current intensity value of the infrared light is greater than or equal to a preset threshold, determining that there is an object shielding the aperture, or if the current intensity value of the infrared light is less than the preset threshold, determining that no object shields the aperture. The preset threshold is an intensity value of infrared light received by the infrared receiver when a dark object shields the aperture.

Figure 5:
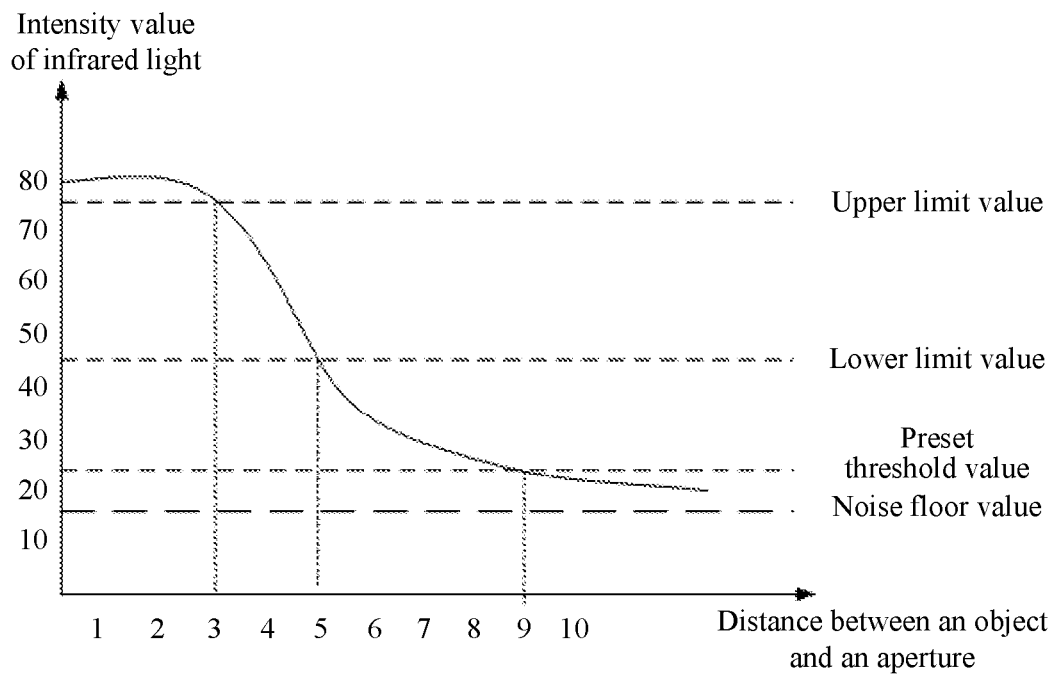
FIG. 5 is a schematic diagram of thresholds according to an embodiment of the present disclosure.

FIG. 5 is a schematic diagram of an upper limit, a lower limit, a preset threshold, and a noise floor value. Referring to FIG. 5, a lateral axis indicates a distance between an object and an aperture, and a longitudinal axis indicates an intensity value of the infrared light. Specific values, namely 1 to 10 on a lateral axis and 10 to 80 on a longitudinal axis, are merely examples for description and do not limit the present disclosure. In this embodiment of the present disclosure, based on the upper limit and the lower limit, the preset threshold is added, and the preset threshold is between a noise floor value and the lower limit.

According to a definition in the prior art, the lower limit is a threshold for turning on a display screen backlight, that is, when the intensity value of the infrared light received by the infrared receiver is less than the lower limit, the display screen backlight is turned on. The noise floor value is used to represent the intensity value of the infrared light in an ideal state that no object shields the aperture. However, in this embodiment of the present disclosure, the preset threshold is the intensity value of the infrared light received by the infrared receiver when the dark object shields the aperture. When the dark object shields the aperture, the intensity of the infrared light received by the infrared receiver was relatively weak because the dark object has a relatively strong capability of absorbing the infrared light. Therefore, the preset threshold is less than the lower limit. When a user holds the electronic device in a call state and black hair shields the aperture, the intensity value of the infrared light reflected to the infrared receiver may be less than the lower limit and greater than or equal to the preset threshold because most of the infrared light emitted by an infrared emitter is absorbed by the black hair. It is determined, according to the intensity of the infrared light, that there is an object shielding the aperture, and further the display screen backlight is turned off. Compared with the prior art, this embodiment of the present disclosure can improve user experience, reduce a loss, and prolong a battery service life.

Next, based on the foregoing embodiment, other methods for adjusting the display screen backlight are described in specific implementations.

In a specific implementation, when the electronic device is in a call state, the included angle between the electronic device and the preset direction is determined and whether there is an object shielding the aperture is determined. When the included angle between the electronic device and the preset direction is greater than or equal to the preset angle and no object shields the aperture, the display screen backlight is turned on. In this specific implementation, although the electronic device in a call state is next to an ear, the display screen backlight is turned on in this case because the intensity of the infrared light received by the infrared receiver is less than the preset threshold, that is, a distance between the ear and the aperture is relatively far.

A difference between the specific implementation and the foregoing embodiment lies in only that whether there is an object shielding the aperture. This can avoid turning off the display screen backlight in a scenario of performing a call far from an ear, improving user experience.

In another specific implementation, the method for controlling the display screen backlight may further include: when the electronic device is in a call state, the included value between the electronic device and the preset direction is determined, and whether there is an object shielding the aperture is determined. When the included angle between the electronic device and the preset direction is less than the preset angle, and a current intensity value of the infrared light is less than the lower limit, the display screen backlight is turned on. In this implementation, it is determined, according to that the included angle between the electronic device and the preset direction is less than the preset angle and the current intensity value of the infrared light is less than the lower limit, that the electronic device is in a non-answering posture currently, and no object shields the aperture. Then, the display screen backlight is turned on. This improves user experience.

In still another specific implementation, the method for controlling the display screen backlight may further include: when the electronic device is in a call state, the included value between the electronic device and the preset direction is determined, and whether there is an object shielding the aperture is determined. When the included angle between the electronic device and the preset direction is less than the preset angle, and the current intensity value of the infrared light is greater than the upper limit, the display screen backlight is turned off. The upper limit is used as a threshold for turning off the display screen backlight when there is an object shielding the aperture. In this implementation, it is determined, according to that the current intensity value of the infrared light is greater than the upper limit, that there is an object shielding the aperture. The display screen backlight is turned off even if the electronic device is in a non-answering state.

With reference to the embodiments shown in FIG. 5 and FIG. 2 and this implementation, it can be learnt that the electronic device turns off the display screen backlight provided that the current intensity value of the infrared light is greater than the upper limit, that is, there is an object shielding the aperture, no matter the included angle between the electronic device and the preset direction is greater than or equal to the preset angle, or the included angle between the electronic device and the preset direction is less than the preset angle.

In yet another specific implementation, the method for controlling the display screen backlight may further include: when the electronic device is in a call state, the included value between the electronic device and the preset direction is determined, and whether there is an object shielding the aperture is determined. When the included angle between the electronic device and the preset direction is less than the preset angle, and the current intensity value of the infrared light is less than or equal to the upper limit and the current intensity value of the infrared light is greater than or equal to the lower limit, a display screen backlight state maintains unchanged. That is, if the electronic device is in a display screen backlight turned-off state at a previous time and the foregoing condition is met at a current time, the electronic device still maintains the display screen backlight turned-off state; or when the electronic device is in a display screen backlight turned-on state at a previous time and the foregoing condition is met at a current time, the electronic device still maintains the display screen backlight turned-on state.

Figure 6:
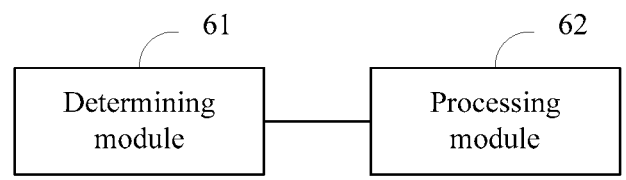
FIG. 6 is a schematic structural diagram of Embodiment 1 of an apparatus for controlling a display screen backlight according to the present disclosure.

FIG. 6 is a schematic structural diagram of Embodiment 1 of an apparatus for controlling a display screen backlight according to the present disclosure. The apparatus for controlling a display screen backlight provided in this embodiment of the present disclosure is applied to an electronic device with an optical proximity sensor. An aperture is disposed on the electronic device, and the optical proximity sensor detects intensity of infrared light by using the aperture. As shown in FIG. 6, the apparatus includes a determining module 61 and a processing module 62.

The determining module 61 is configured to: when it is detected that an electronic device is in a call state, determine an included angle between the electronic device and a preset direction, and determine whether there is an object shielding an aperture.

The processing module 62 is configured to turn off the display screen backlight when the included angle between the electronic device and the preset direction is greater than or equal to a preset angle and there is an object shielding the aperture.

The apparatus in this embodiment of the present disclosure may be configured to execute the technical solution of the method embodiment shown in FIG. 2. An implementation principle and a technical effect of the apparatus are similar to those of the technical solution, and details are not described herein again.

Based on the foregoing embodiment, the preset direction may be a vertical direction. The determining module 61 may be further configured to determine an included angle between the vertical direction and an axis perpendicular to a plane where a display screen of the electronic device is located; or, in another implementation, the determining module 61 may be further configured to determine an included angle between the vertical direction and a plane where a display screen of the electronic device is located.

Optionally, the determining module 61 may be further configured to: determine a current intensity value of the infrared light; and if the current intensity value of the infrared light is greater than or equal to a preset threshold, determine that there is an object shielding the aperture, or if the current intensity value of the infrared light is less than a preset threshold, determine that no object shields the aperture.

It should be noted that when the preset threshold is an intensity value of infrared light received by the infrared receiver when a dark object shields the aperture.

Optionally, the processing module 62 may be further configured to turn on the display screen backlight when the included angle between the electronic device and the preset direction is greater than or equal to the preset angle and no object shields the aperture.

The apparatus for controlling a display screen backlight provided in this embodiment of the present disclosure is specifically configured to execute any embodiment of the method for controlling the display screen backlight. A technical principle and a technical effect of the apparatus for controlling the display screen backlight are similar to those of the embodiment of the method for controlling the display screen backlight, and no details are described herein again.

Figure 7:
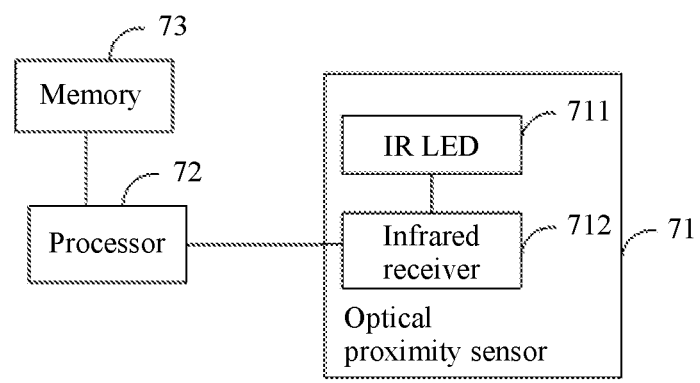
FIG. 7 is a schematic structural diagram of Embodiment 1 of an electronic device for controlling a display screen backlight according to the present disclosure.

FIG. 7 is a schematic structural diagram of Embodiment 1 of an electronic device for controlling a display screen backlight according to the present disclosure. As shown in FIG. 7, an electronic device 70 for controlling a display screen backlight provided in this embodiment of the present disclosure has an optical proximity sensor 71. The optical proximity sensor 71 includes an IR LED 711 and an infrared receiver 712, and an aperture (not shown in the figure) is disposed on the electronic device 70. The IR LED 711 emits infrared light, the infrared receiver 712 receives infrared light that is outside the aperture and that is reflected by an object located in a direction in which the IR LED emits the infrared light. The electronic device 70 may further include a processor 72 and a memory 73.

The memory 73 is configured to store an executable instruction.

The processor 72 is configured to execute the executable instruction stored in the memory 73, so as to implement the solution in any foregoing embodiment of the method for controlling the display screen backlight.

Optionally, the electronic device 70 may further include a gravity sensor (not shown). The gravity sensor is configured to determine an included angle between the electronic device 70 and a preset direction, and the determining an included angle between the electronic device 70 and a preset direction is specifically: determining an included angle between a vertical direction and an axis perpendicular to a plane where a display screen of the electronic device 70 is located; or determining an included angle between the vertical direction and a plane where a display screen of the electronic device 70 is located.

The electronic device provided in this embodiment is specifically configured to perform any foregoing embodiment of the method for controlling the display screen backlight. A technical principle and a technical effect of the electronic device are similar to those of the embodiment of the method for controlling the display screen backlight, and details are not described herein again. Persons of ordinary skill in the art may understand that all or some of the steps of the method embodiments may be implemented by a program instruction relevant hardware. The program may be stored in a non-transitory (non-transitory) computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended to describe the technical solutions some embodiments of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for controlling a display screen backlight of an electronic device, comprises:
   in response to a determination that the electronic device is in a calling state, determining, by the electronic device, an included angle between the electronic device and a preset direction;
   determining, by the electronic device, whether there is an object shielding an aperture of the electronic device based on a preset threshold, wherein the aperture is used to detect intensity of infrared light by the electronic device, wherein the preset threshold is an intensity value of infrared light received by an optical proximity sensor when a dark object shields the aperture, wherein the preset threshold is less than a lower limit to account for a portion of infrared light emitted by an infrared emitter being absorbed by the dark object, wherein the lower limit is a fixed threshold for turning on display screen backlight of the electronic device when there is no object shielding the aperture of the electronic device, and wherein determining whether there is an object shielding the aperture comprises:
   determining a current intensity value of the infrared light; and
   based on a determination that the current intensity value of the infrared light is less than the lower limit and greater than or equal to the preset threshold, determining that there is an object shielding the aperture; and
   based on a determination that the included angle between the electronic device and the preset direction is greater than or equal to a preset angle and a determination that there is the object shielding the aperture, turning off, by the electronic device, the display screen backlight of the electronic device.

2. The method of claim 1, wherein the preset direction is a vertical direction, and the determining an included angle comprises:
   determining an included angle between the vertical direction and an axis perpendicular to a plane in which a display screen of the electronic device is located.

3. The method of claim 1, wherein the preset direction is a vertical direction, and the determining an included angle comprises:
   determining an included angle between the vertical direction and a plane in which a display screen of the electronic device is located.

4. The method of claim 1, wherein the determining whether there is an object shielding the aperture comprises:
   based on a determination that the current intensity value of the infrared light is greater than or equal to the lower limit, determining that there is an object shielding the aperture.

5. The method of claim 1, wherein the determining whether there is an object shielding the aperture comprises:
   based on a determination that the current intensity value of the infrared light is less than the preset threshold, determining that there is no object shielding the aperture.

6. The method of claim 1, wherein the method further comprises:
   determining the included angle and step of determining whether there is an object shielding an aperture of the electronic device continuously; and
   based on a determination that the included angle between the electronic device and the preset direction is greater than or equal to the preset angle and there is no object shielding the aperture, turning on, by the electronic device, the display screen backlight.

7. An electronic device comprising:
   an optical proximity sensor which comprising an infrared emitting diode and an infrared receiver;
   an aperture disposed on the electronic device;
   wherein the infrared emitting diode emits infrared light, the infrared receiver receives the infrared light that is outside the aperture and that is reflected by an object located in a direction in which the infrared emitting diode emits the infrared light;
   a processor;
   a non-transitory computer-readable storage medium coupled to the processor and storing programming instructions for execution by the processor, the programming instructions instruct the processor to:
   in response to a determination that the electronic device is in a calling state, determine an included angle between the electronic device and a preset direction;
   determine whether there is an object shielding an aperture of the electronic device based on a preset threshold, wherein the preset threshold is an intensity value of infrared light received by the optical proximity sensor when a dark object shields the aperture, wherein the preset threshold is less than a lower limit to account for a portion of infrared light emitted by the infrared emitting diode being absorbed by the dark object, wherein the lower limit is a fixed threshold for turning on display screen backlight of the electronic device when there is no object shielding the aperture of the electronic device, and wherein the programming instructions further instruct the processor to:
   determine a current intensity value of the infrared light; and
   based on a determination that the current intensity value of the infrared light is less than the lower limit and greater than or equal to the preset threshold, determine that there is an object shielding the aperture; and
   based on a determination that the included angle between the electronic device and the preset direction is greater than or equal to a preset angle and a determination that there is the object shielding the aperture, turn off the display screen backlight of the electronic device.

8. The electronic device of claim 7, wherein the programming instructions further instruct the processor to:
    determine an included angle between a vertical direction and an axis perpendicular to a plane in which a display screen of the electronic device is located.

9. The electronic device of claim 7, wherein the programming instructions further instruct the processor to:
    determine an included angle between a vertical direction and a plane in which a display screen of the electronic device is located.

10. The electronic device of claim 7, wherein the programming instructions further instruct the processor to:
    based on a determination that the current intensity value of the infrared light is greater than or equal to the lower limit, determine that there is an object shielding the aperture.

11. The electronic device of claim 7, wherein the programming instructions further instruct the processor to:
    based on a determination that the current intensity value of the infrared light is less than the preset threshold, determine that there is no object shields the aperture.

12. The electronic device of claim 7, wherein the programming instructions further instruct the processor to:
    based on a determination that the included angle between the electronic device and the preset direction is greater than or equal to the preset angle and there is no object shielding the aperture, turn on the display screen backlight.

13. A non-transitory computer-readable medium having instructions stored therein, which when executed by a processor, cause the processor to perform operations, the operations comprising:
    in response to a determination that an electronic device is in a calling state, determining, by the electronic device, an included angle between the electronic device and a preset direction;
    determining, by the electronic device, whether there is an object shielding an aperture of the electronic device based on a preset threshold, wherein the aperture is used to detect intensity of infrared light by the electronic device, wherein the preset threshold is an intensity value of infrared light received by an optical proximity sensor when a dark object shields the aperture, wherein the preset threshold is less than a lower limit to account for a portion of infrared light emitted by an infrared emitter being absorbed by the dark object, wherein the lower limit is a fixed threshold for turning on display screen backlight of the electronic device when there is no object shielding the aperture of the electronic device, and wherein the operations comprise:
    determining a current intensity value of the infrared light; and
    based on a determination that the current intensity value of the infrared light is less than the lower limit and greater than or equal to the preset threshold, determining that there is an object shielding the aperture; and
    based on a determination that the included angle between the electronic device and the preset direction is greater than or equal to a preset angle and a determination that there is the object shielding the aperture, turning off, by the electronic device, the display screen backlight of the electronic device.

14. The non-transitory computer-readable medium of claim 13, wherein the preset direction is a vertical direction, and wherein the operations comprise:
    determining an included angle between the vertical direction and an axis perpendicular to a plane where a display screen of the electronic device is located.

15. The non-transitory computer-readable medium of claim 13, wherein the preset direction is a vertical direction, and wherein the operations comprise:
    determining an included angle between the vertical direction and a plane where a display screen of the electronic device is located.

16. The non-transitory computer-readable medium of claim 13, wherein the operations comprise:
    based on a determination that the current intensity value of the infrared light is greater than or equal to the lower limit, determining that there is an object shielding the aperture; or
    based on a determination that the current intensity value of the infrared light is less than the preset threshold, determining that there is no object shields the aperture.

17. The non-transitory computer-readable medium of claim 13, wherein the operations comprise:
    executing step of determining the included angle and step of determining whether there is an object shielding an aperture of the electronic device continuously; and
    based on a determination that the included angle between the electronic device and the preset direction is greater than or equal to the preset angle and there is no object shielding the aperture, turning on, by the electronic device, the display screen backlight.

* * * * *